UNITED STATES PATENT OFFICE.

DANIEL M. LAMB, OF NEW YORK, N. Y.

IMPROVEMENT IN THE PRODUCTION OF WATER-PROOF GUMS.

Specification forming part of Letters Patent No. 196,677, dated October 30, 1877; application filed September 27, 1877.

*To all whom it may concern:*

Be it known that I, DANIEL MARTIN LAMB, formerly of Strathroy, Canada, now of the city of New York, in the State of New York, have invented or discovered a new and useful Improvement in the Production of Water-Proof Gum, of which the following is a specification:

In Letters Patent of the United States No. 140,281 and No. 140,282, dated July 24, 1873, and No. 144,623, dated November 18, 1873, I describe "water-proof gum made from the inspissated juice of plants of the *Asclepias* or milkweed family, or of any analogous plants possessing like properties," and certain processes for producing or extracting the same, said gum having been conceived to be valuable for use in the arts as a substitute for or compounded with ordinary caoutchouc, or rubber, or gutta-percha. The existence of said gum in sufficiently large quantities to pay for its extraction, and the usefulness of the same when properly extracted, have been demonstrated by all subsequent experiments.

But, proceeding at the dates of said processes without the advantages of sufficient experience of my own or of others as to the habits and structure of the plant to be utilized, and the effects of the treatment then practiced being only determinable after the lapse of considerable time, said processes now appear to be fatally defective in certain particulars.

During the latter part of over four years' experience in the study, culture, harvesting, and treating of milkweed, and in the use of solvents for the production of milkweed gum, I have made the following fundamental discoveries, namely:

First, that the gummy properties of milkweed exist only, in any considerable quantity, within the main stalk, where the gum particles are deposited by the juice in minute cells, growing successively during the entire summer, or throughout the growth of the plant. Consequently the weed should not be gathered until it is fully matured.

Second, that the gum particles, once deposited, remain in said cells, and are not lost by the evaporation of the juice. Consequently there is no advantage in harvesting the plant when in blossom, for example; but, on the contrary, great advantages are gained by allowing it to dry and bleach in the sunshine and open air, as the gum is thus decolorized or rendered free from mixture with the coloring matter of the stalk, and is freed from watery particles in the most effective and inexpensive manner.

Third, that the use of an active solvent is absolutely essential for extracting said gum in paying quantities. Only the watery particles, with a mere trace of the gum, can be expressed from the green weed, and even after the partial decomposition of the chopped weed by pulping and by fermentation only a small percentage of the gum can be separated by expression, the bulk adhering to the woody fiber.

Fourth, that the milkweed gum, in its natural state, contains an excess of free oil or fatty matter for most, if not all, practical purposes. Consequently the gum is injured, and not benefited, by the mixture therewith of any of the hydrogenous residuums of petroleum; and it is practically impossible, by any method known to me, to remove said residuums of petroleum, or said excess of free oil or fatty matter, from the extracted gum, without destroying the latter.

Fifth, that all the hydrocarbon oils, including naphtha and gasoline, yield more or less of said hydrogenous residuum or heavy oil under redistillation. The adulteration of the milkweed gum by said hydrogenous residuum or heavy oil cannot, therefore, be avoided when the lightest of said products of petroleum are employed as its solvent, if the solution is subjected to distillation. Gasoline has been evaporated from the gum, so as to leave no residuum by exposure in the open air; but this involves the loss of the solvent, which renders the process impractically expensive as well as tedious.

Sixth, that a cheap and efficient solvent for extracting the milkweed gum is the bisulphide of carbon. This can be readily recovered for reuse with a loss of not more than one-half of one per cent., leaving the gum perfectly pure, excepting a trace of sulphur, the addition of which to the gum improves the latter, while its loss to the bisulphide improves the dissolving property of this and deodorizes it.

Seventh, that the said excess of free oil or fatty matter in the milkweed gum itself can be, and is, gotten rid of simultaneously with the liberation of the gum particles from the woody matter, in part by pulping the weed, by means of steam, and floating off the free oil or fatty matter thus separated, and more perfectly by the subsequent fermentation and decomposition of the pulp, which can be safely and economically continued until the mass is reduced in dry weight at least one-fourth, the heat of fermentation operating meanwhile to expel the remaining free oil or fatty matter to a sufficient extent to render the gum ready for use as soon as separated from the woody matter.

Based on the foregoing discoveries, my present invention consists in the complete and practical process or method, hereinafter described, whereby milkweed gum is successfully and profitably extracted, without adulteration, and free from excess of free oil or fatty matter; also, in the product of said process, as specified.

This process is designed for application to all varieties of plants of the genus *Asclepias*, and to other similar plants possessing like properties. The variety which I prefer to employ is the common milkweed, (*Asclepias cornutus* or *Asclepias rosa*,) which grows in large quantities in the United States and Canada.

The weed should be allowed to stand until it has thoroughly matured, and, preferably, until it has dried and bleached in the field. When cut before it is thoroughly dry it should be left on the ground for several days before being carted away, both for the bleaching effect of such exposure and in order to prevent premature fermentation, as the material is very offensive while in this state, and ferments very readily. For the same reason, care should be taken never to pack the raw weed wet or green.

The dried and bleached weed is prepared for subsequent treatment by cutting or chopping the same, so as to reduce it. The raw weed is thus reduced to the state of chaff. The weed-chaff is fed into a pulping-vat, and after the vat is filled or partially filled with chaff, water is introduced, and steam is then introduced. This steaming operation should continue about twenty-four hours, or until the weed is pulped or softened. When the surface of the water in the vat, as raised by the condensation of the steam, has reached the top of the steamed mass, it will be found to float a considerable quantity of free oil or fatty matter, extracted from the weed. The floating oil or fatty matter is drawn off, and, when the pulping operation is completed, the water is also drawn off.

The milkweed pulp is removed from the pulping-vat to a fermenting-floor, and then fermented. Another large quantity of free oil or fatty matter is expelled by the heat of fermentation during this stage of the process.

Artificial heat may be used in cold weather to quicken the operation. I propose to leave each pile of pulp on the fermenting-floor until it is reduced in dry weight about one-fourth, and until all excess of free oil or fatty matter is driven off, which can be ascertained by observations. This operation will occupy from one week, or less, to two weeks, according to the weather, the thoroughness of the pulping operation, and other circumstances.

The fermented pulp is next dried, and is then ground. The ground pulp is packed into a percolator. The chamber above the strainer of this apparatus is filled with the pulp to about six inches from the top, and its cover is then attached. This cover is provided with a short pipe having a tight stop-cock, and adapted to be coupled to a pipe leading from a tank of bisulphide of carbon. This connection is made and the solvent is drawn in until the pulp is covered, a glass-covered opening in the cover of the percolator providing for ascertaining when enough has been introduced. The pulp is allowed to soak in the solvent about twenty-four hours, and the latter is then drawn off, carrying with it a part of the gum in solution. The pulp is covered a second time with bisulphide, and the operation is repeated, the extraction of the gum being this time completed. I have found two hundred and fifty pounds of bisulphide per hundred weight of dried pulp to be sufficient to thoroughly extract the gum.

The discharge-neck of the percolator is provided with a stop-valve, and a small quantity of cotton, wool, or flax is stuffed in its extremity to strain the solution as it escapes.

When the pulp is drained the second time, the said valve in the discharge-neck is closed, and the pulp is covered with water, which may be introduced through the bisulphide-pipe. When the pulp is covered with water, as aforesaid, steam is admitted into a jacket surrounding the body of the percolator, and the mass is heated, so as to vaporize and expel the bisulphide, which, passing into the chamber formed by the dome-shaped cover of the percolator, passes off into the worm of a condenser, being liquefied in the latter, and thus recovered. A stop-cock at the extremity of the worm discharges the condensed bisulphide into a pipe leading to a tank in the cellar. When the escape through this cock $y$ ceases, the steam is shut off and the waste contents of the percolator are discharged.

The extracted gum held in solution by the solvent is drawn into a still having a water-jacket, with external steam-jacket, said still and the percolator being preferably so arranged with reference to each other that the solution can be drawn from the latter into the still without intermediate handling.

The water-jacket of the still is filled, and the gum-chamber is supplied with a depth of about six inches of water. The solution is then drawn into the still as aforesaid, and, being heavier than the water, is covered by the latter. The still is now closed, and steam is turned into the outer jacket thereof, a gentle and uniform heat being applied to the confined solution by means of the water-jacket and the floating body of water, as these absorb the steam heat. The vapor of the solvent, separated by the said floating water, passes into the worm of a second condenser and is rapidly condensed, the recovered solvent being drawn off through a cock at its extremity into the cellar-tank aforesaid, from which the solvent may be pumped into a small elevated tank, so as to flow from the latter into the percolator.

A heat of about 130° Fahrenheit in the percolator and still is sufficient for vaporizing the bisulphide. The temperature in the condensers should be about 55° Fahrenheit. While held in solution by the bisulphide, the gum absorbs a trace or small percentage of sulphur, as before mentioned, and the chemical is deodorized to a very great extent, while its dissolving quality is improved rather than impaired.

The gum, when taken out of the still, may be washed with water to cleanse it.

Finally, the gum may be dried in the sunshine or by artificial heat, to facilitate handling or storing it.

By this process about one hundred pounds of water-proof gum is extracted from each ton of dried milkweed, at a cost of about fifteen cents per pound.

The product, as taken from bleached weed, is a grayish-brown water-proof gum, without the excess of free oil or fatty matter which has heretofore prevented the practical use of milkweed gum, and having in its stead a trace or small percentage of sulphur derived from the bisulphide, which improves the gum for vulcanization, and does not impair it for any use. The color of the new gum is also lighter than that of specimens heretofore obtained by other processes, which adapts the new gum to receive different colors in use.

The apparatus herein mentioned forms no part of the present invention, and other apparatus adapted to produce the described results may be employed.

Having thus described my said invention or discovery, I would have it understood that the following is what I now claim as new, and desire to secure by Letters Patent of the United States, namely:

1. The method of preparing milkweed for utilization, consisting in taking the same, after it has fully matured by standing in the field until it has ripened, and, while in a dry and bleached state, treating the same by cutting, pulping, and fermenting operations, and by the removal of free oil or fatty matter, substantially as herein set forth, in order that water-proof gum may be extracted therefrom, free or nearly free from coloring matter, and from excess of said free oil or fatty matter.

2. The method of extracting water-proof gum from fermented milkweed pulp, consisting in grinding or bruising said pulp after it has been dried, in order to liberate the gum particles, and then applying bisulphide of carbon to dissolve and carry off the latter, substantially as herein specified.

3. The combined process of producing milkweed gum, consisting in reducing the dry weed successively to chaff and pulp, then fermenting, drying, and grinding the same, and finally extracting the liberated gum particles by the repeated use of bisulphide of carbon as a solvent, substantially as herein set forth.

4. The product of the said process, consisting of milkweed gum free from excess of free oil or fatty matter, and having a trace of sulphur as left therein by the bisulphide of carbon used in its extraction, as specified.

D. M. LAMB.

Witnesses:
JAS. L. EWIN,
WM. MCMAIN.